(12) United States Patent
Phillips et al.

(10) Patent No.: US 7,938,145 B2
(45) Date of Patent: May 10, 2011

(54) COUPLER INCLUDING ELECTRICAL AND PNEUMATIC INTERFACES

(75) Inventors: David M. Phillips, Indianapolis, IN (US); Toru Fujiwara, Indianapolis, IN (US)

(73) Assignee: SMC Corporation of America, Noblesville, IN (US)

( * ) Notice: Subject to any disclaimer, the term of this patent is extended or adjusted under 35 U.S.C. 154(b) by 237 days.

(21) Appl. No.: 11/445,738

(22) Filed: Jun. 2, 2006

(65) Prior Publication Data

US 2007/0278436 A1    Dec. 6, 2007

(51) Int. Cl.
*F16K 11/10* (2006.01)
(52) U.S. Cl. ........................................ 137/884
(58) Field of Classification Search .................... 137/884
See application file for complete search history.

(56) References Cited

U.S. PATENT DOCUMENTS

| | | | | |
|---|---|---|---|---|
| 3,513,876 A | * | 5/1970 | Tarbox | 137/596 |
| 3,654,960 A | * | 4/1972 | Kiernan | 137/884 |
| 3,698,432 A | * | 10/1972 | Kutz | 137/884 |
| 4,726,393 A | * | 2/1988 | Herner | 137/269 |
| 4,815,496 A | * | 3/1989 | Nishitani et al. | 137/884 |
| 5,996,610 A | * | 12/1999 | Sato et al. | 137/271 |
| 6,830,067 B2 | * | 12/2004 | Hayashi | 137/554 |
| 6,874,537 B2 | * | 4/2005 | Hayashi et al. | 137/884 |
| 7,040,346 B2 | * | 5/2006 | Boertje et al. | 137/554 |
| 7,048,002 B2 | * | 5/2006 | Hayashi et al. | 137/560 |
| 2004/0089352 A1 | * | 5/2004 | Hayashi et al. | 137/560 |

OTHER PUBLICATIONS

FESTO, "CPA-SC Valve Manifold", Feb. 2006, pp. 1-68, web document.
FESTO, "High Density Valve Terminal, Type MHA1-2X-SA", Feb. 2005, pp. 1-2, web document.

* cited by examiner

*Primary Examiner* — John Fox
(74) *Attorney, Agent, or Firm* — Bose McKinney & Evans LLP

(57) ABSTRACT

A coupler including electrical and pneumatic interfaces. The coupler includes a manifold having pneumatic apertures and a support having connector apertures to accommodate one or more valves.

25 Claims, 9 Drawing Sheets

FIG. 1

COUPLER INCLUDING ELECTRICAL AND PNEUMATIC INTERFACES

BACKGROUND AND SUMMARY OF THE INVENTION

The present invention relates to couplers. More particularly, the present invention relates to couplers having a plurality of apertures configured to connect to a plurality of tubes. Couplers include manifolds utilizing a molded or formed block having apertures to receive plug-in-style valves. The valves connect to fluid apertures formed in the block and to electrical connections provided by electrical connectors.

In accordance with one aspect of the invention, there is provided a coupler including a manifold having a fluid passageway portion adapted to couple to a fluid control device, a standoff coupled to the fluid passage way portion, and a connector support, coupled to the manifold. The connector support includes a mating feature, located proximate the standoff.

In accordance with another aspect of the present invention there is provided, a coupler including a manifold having a fluid passageway portion having a first surface, to form an interface between the fluid passageway portion and a device, and a ledge, spaced a predetermined distance from the surface. A cover including an aperture is adapted to receive a connector, wherein the cover is located proximate the ledge, to provide a predetermined spacing between the aperture and the surface.

In accordance with still another aspect of the present invention there is provided, a coupler, to couple a pneumatic device to a connector having a first leg and a second leg spaced a distance apart. The coupler includes a manifold including a fluid passageway portion adapted to couple to a fluid control device, and a standoff spaced from the fluid passageway portion. A connector support is coupled to the manifold. The connector support includes a mating feature, located proximate the standoff, and an aperture, configured to receive the connector.

BRIEF DESCRIPTION OF THE DRAWINGS

A detailed description particularly refers to the accompanying figures in which.

DETAILED DESCRIPTION OF THE DRAWINGS

Figure 1:
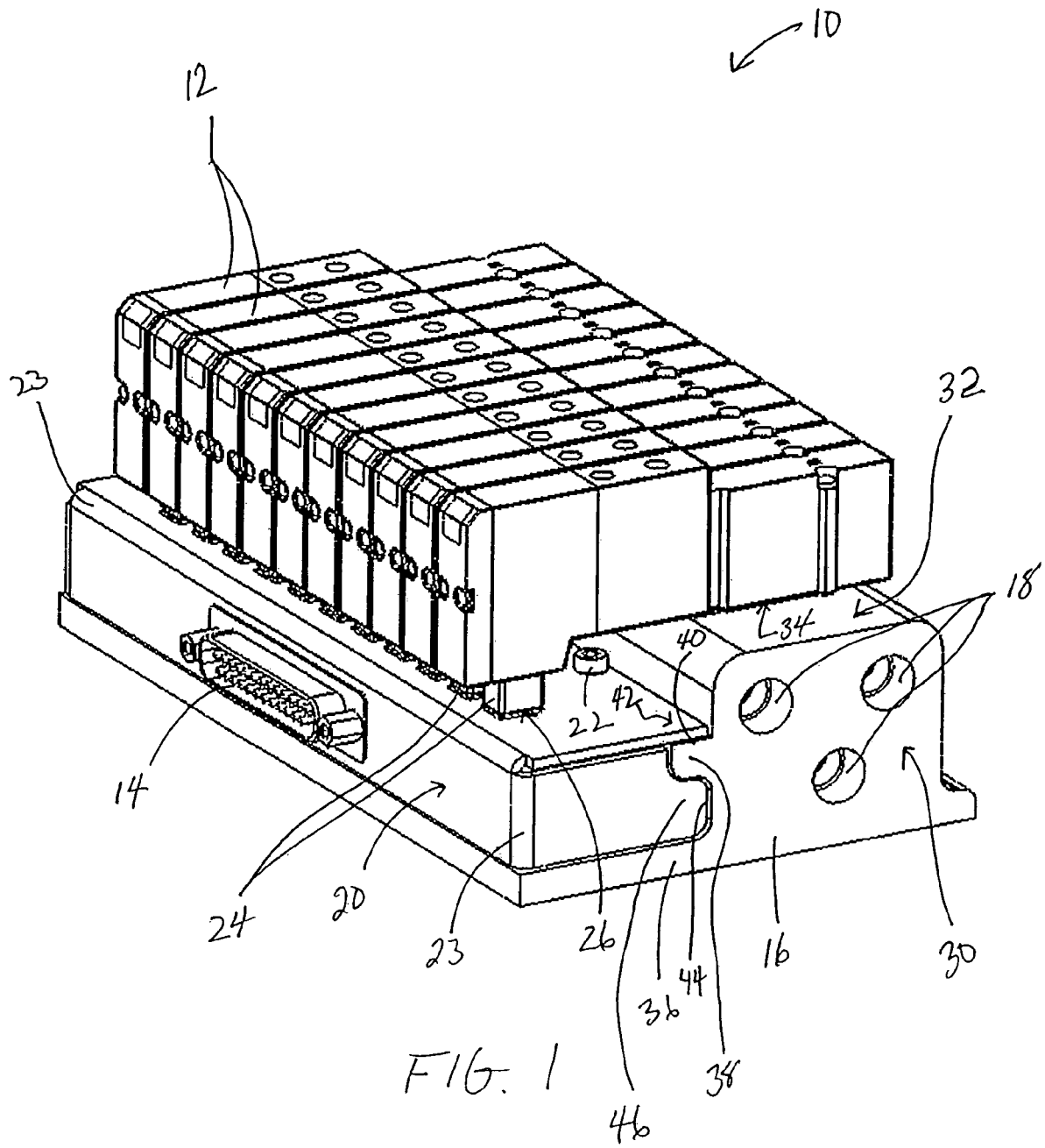
FIG. 1 illustrates a perspective view of a coupler including a manifold, a connector support, and a plurality of valves.

For the purposes of promoting and understanding the principals of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principals of the invention as illustrated therein being contemplated as would normally occur to one skilled in the art to which the invention relates.

FIG. 1 illustrates a perspective view of a coupler 10, or fluid control apparatus, which includes a plurality of control valves 12 to control the flow of a fluid such as air, liquid, or gas, under the control of electrical signals received through an electrical connector 14. The electrical connector 14 includes a number of contacts which are wired to a control system (not shown) for controlling the fluid which passes through a manifold 16, or block, having a plurality of apertures 18, which can be threaded or which also can include push to fit apertures to receive either tubes or pipes (not shown) for transmitting the fluid which passes through fluid passageways formed in the manifold 16. The manifold can include one or more pieces, but as illustrated is a unitary member. The manifold can be formed of machined metal or formed plastics.

The coupler 10 includes a support 20 which is coupled to the manifold 16 by one or more fasteners 22 which can include screws, bolts, or other known couplers. The cover or support 20 can be made from a sheet of metal including one or more pieces. If made from a single sheet of metal, the support 20 is configured or bent to include bends 23 and cut to fit or engage with the manifold 16 to hide or enclose cabling or wires which connect the electrical connector 14 to one or more electrical connectors 24 which are received by one or more apertures 26 formed in the support 20. Each of the electrical connector 24 are coupled to one or more corresponding or mating electrical connectors (not shown) included in each of the control valves 12.

The manifold 16 includes a first portion 30 defining a surface 32 upon which a surface 34 of each of the plurality of control valves can rest. The manifold 16 further includes a base 36 extending from the first portion 30 which receives the support 20. Also, extending from the first portion 30 is a standoff 38, or shelf or ledge, defining a top surface 40 which is substantially parallel with the surface 32 but offset therefrom. The connector support 20 includes a mating feature 42 which contacts the top surface 40 and which is coupled thereto by the fastener or fasteners 22. The manifold 16 further includes an undercut 44 to receive a tongue 46 of the connector support 20 which can provide registration of the support 20 to the manifold 16.

Figure 2:
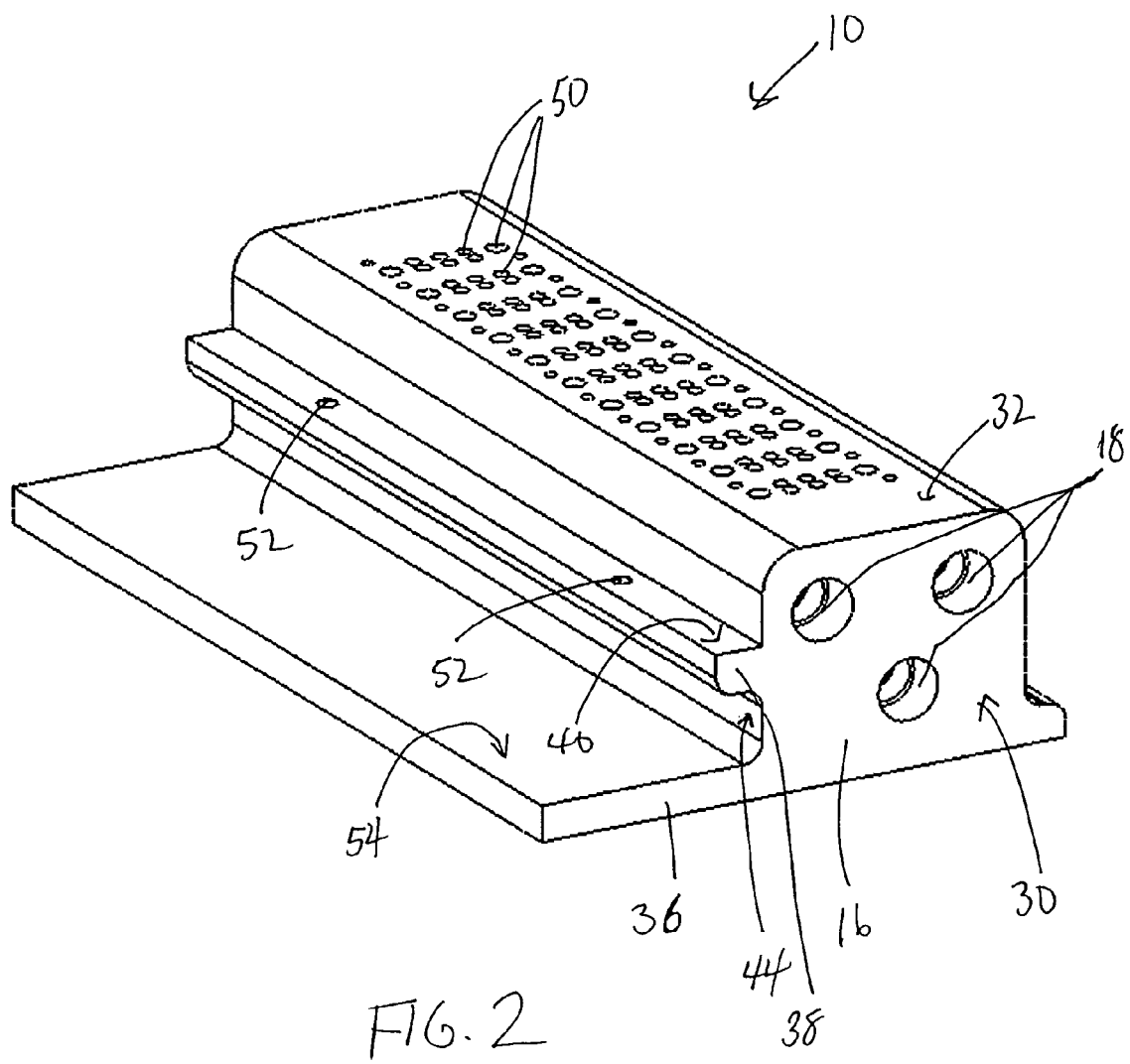
FIG. 2 illustrates a perspective view of a manifold.
Figure 3:
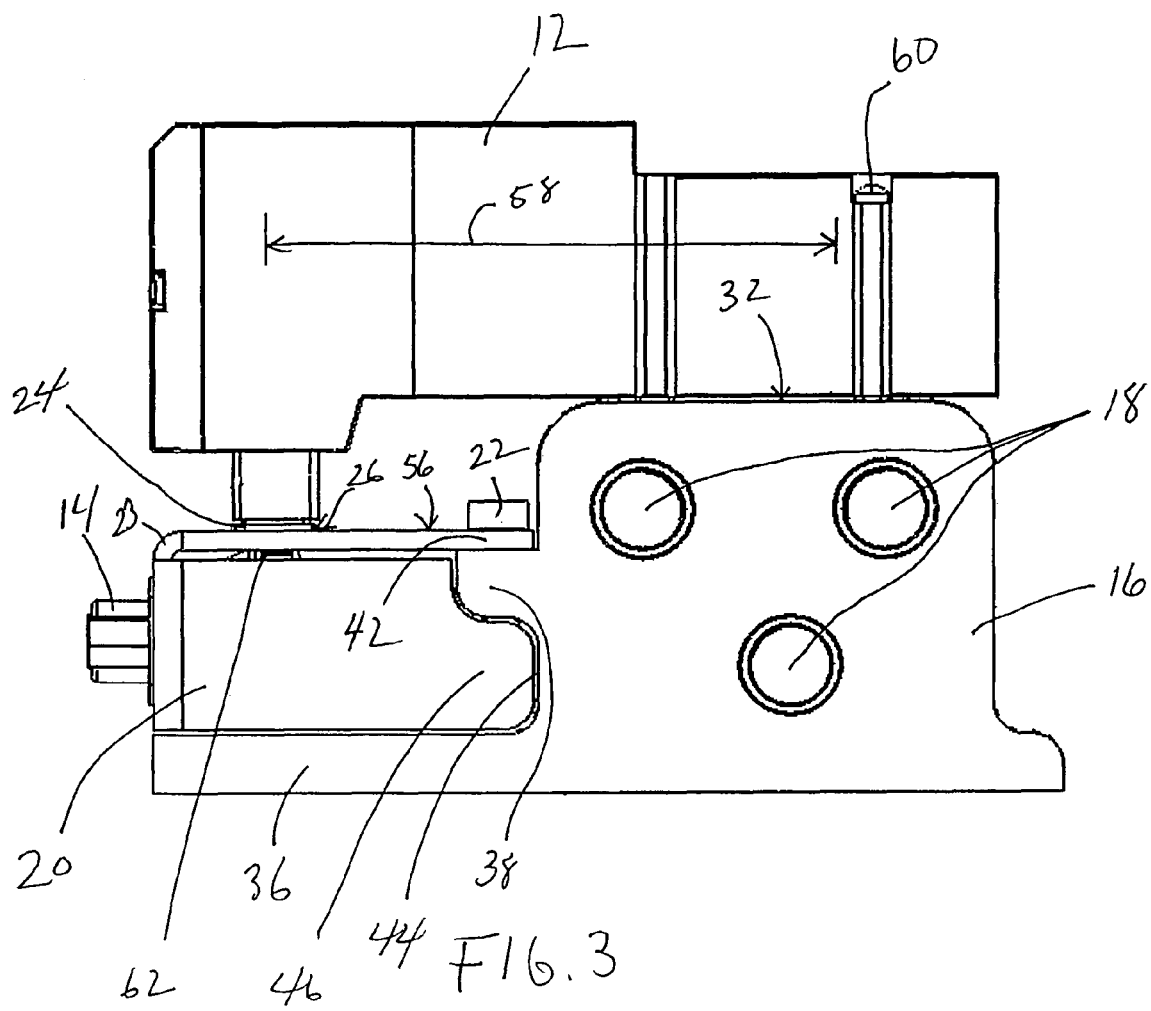
FIG. 3 illustrates an end view of the coupler of FIG. 1.

Each of the valves 12 includes a plurality of fluid passageways (not shown) which are coupled to a plurality of apertures 50 (see FIG. 2) defined in the first portion 30 of the manifold 16. Located between the valves 12, when coupled to the manifold, and the surface 32 of the manifold 16 is a plurality of gaskets, typically for one for each of the valves 12, to provide a fluid tight seal between the valves and the manifold 16. As can also be seen in FIG. 2, the standoff 38 can include one or more threaded apertures 52 to receive the fastener 22. The base 36 includes a base surface 54 upon which the connector support 20 can be supported. When the connector support 20 is assembled to the manifold 16, a surface 56 of the mating feature 42 is substantially parallel to the surface 32 of the first portion 30 as illustrated in FIG. 3. Because the standoff 38 includes a top surface 40 which has been formed to be substantially parallel with the top surface 32, the mating feature 42, which in the described embodiment of FIG. 3 is a portion of the sheet metal forming the support 20, the surface 56 is therefore substantially parallel with respect to the surface 32. In addition, because the mating feature 42 includes predefined apertures for receiving the fasteners 22 which are inserted into the apertures 52 of the manifold 16, a distance 58 or spacing between the fluid apertures 50 and the aperture 26 formed in the cover 20 can be controlled such that coupling the valve 12 to the manifold 16 with one or more fasteners 60 provides a substantially consistent electrical and pneumatic interface for mounting the valve 12 to the electrical connector 24 and the fluid apertures 50. FIG. 3 also illustrates a portion of a wiring harness 62 which couples the electrical connector 14 to the connectors 24.

Figure 4:
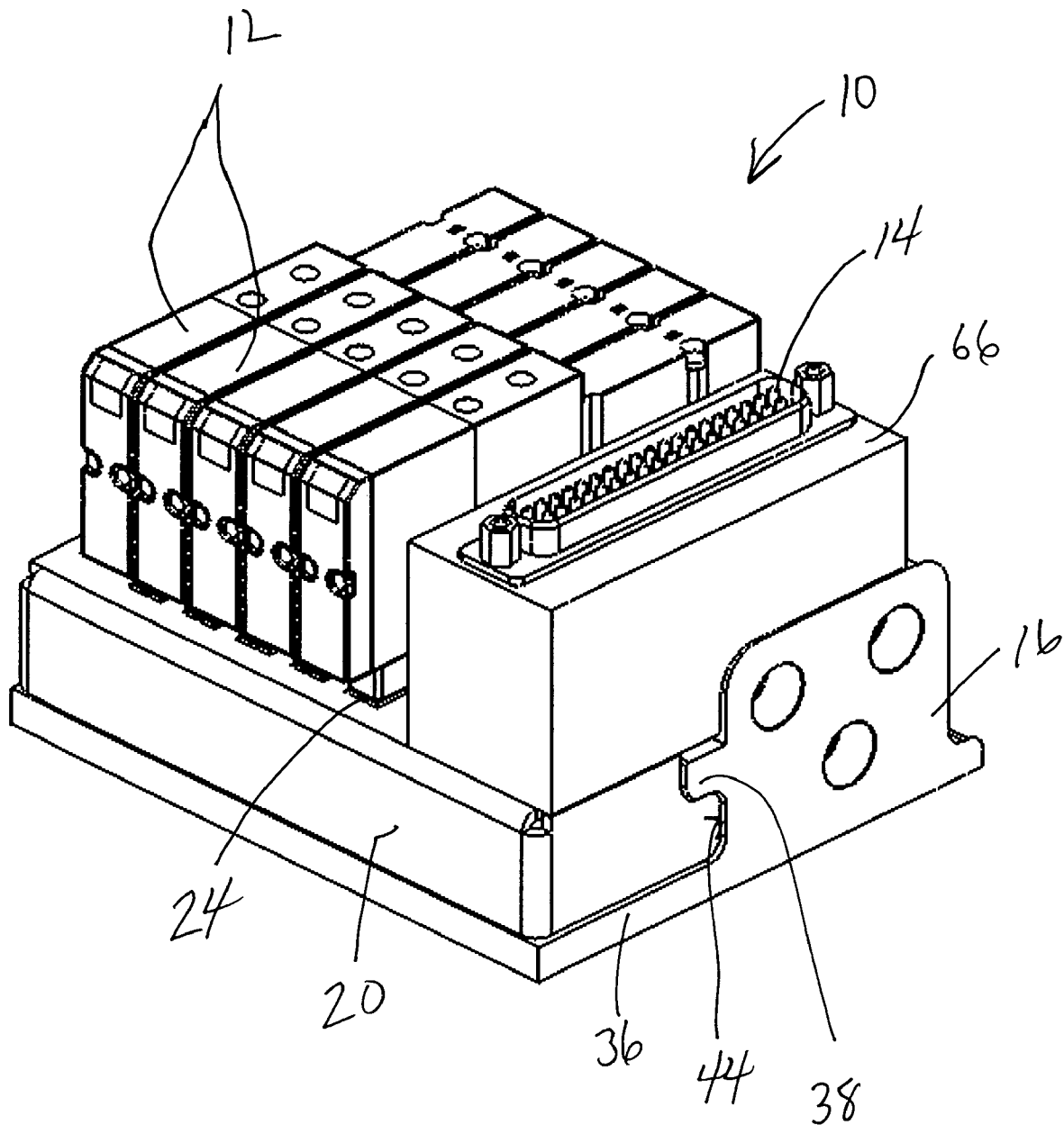
FIG. 4 illustrates another embodiment of the coupler.

FIG. 4 illustrates another embodiment of the coupler 10 of the present invention. As illustrated, the coupler 10 includes a plurality of valves 12 supported by the manifold 16 and the connector support 20. As previously described, the electrical connector 14 is coupled to a plurality of electrical connectors 24 which are held in place by the support 20. In the embodiment of FIG. 4, however, a housing 66 can be used to mount the electrical connector 14 in a different orientation than that previously described with respect to FIG. 1. The housing 66 is fixed or held in place to either the manifold 16, the support 20, or to both as would be understood by those skilled in the art. The wiring harness 62, which is not seen in FIG. 4, is coupled to the electrical connector 14 and passes through a cavity of the housing 66 and into the cavity defined by the support 20 with respect to the manifold 16 and to the electrical connectors 24. The housing 66 includes a predefined aperture to receive the connector 14 such that the connector 14 faces upwardly as illustrated to receive a mating electrical connector. Such an orientation may be preferred over the orientation disclosed in FIG. 1 depending on the application of the coupler 10. As further illustrated in FIG. 4, the coupler 10 includes five valves whereas the embodiment of FIG. 1 includes 11 valves. Consequently, the present invention includes couplers for mounting any number of the valves 12 from one to more than one.

Figure 5:
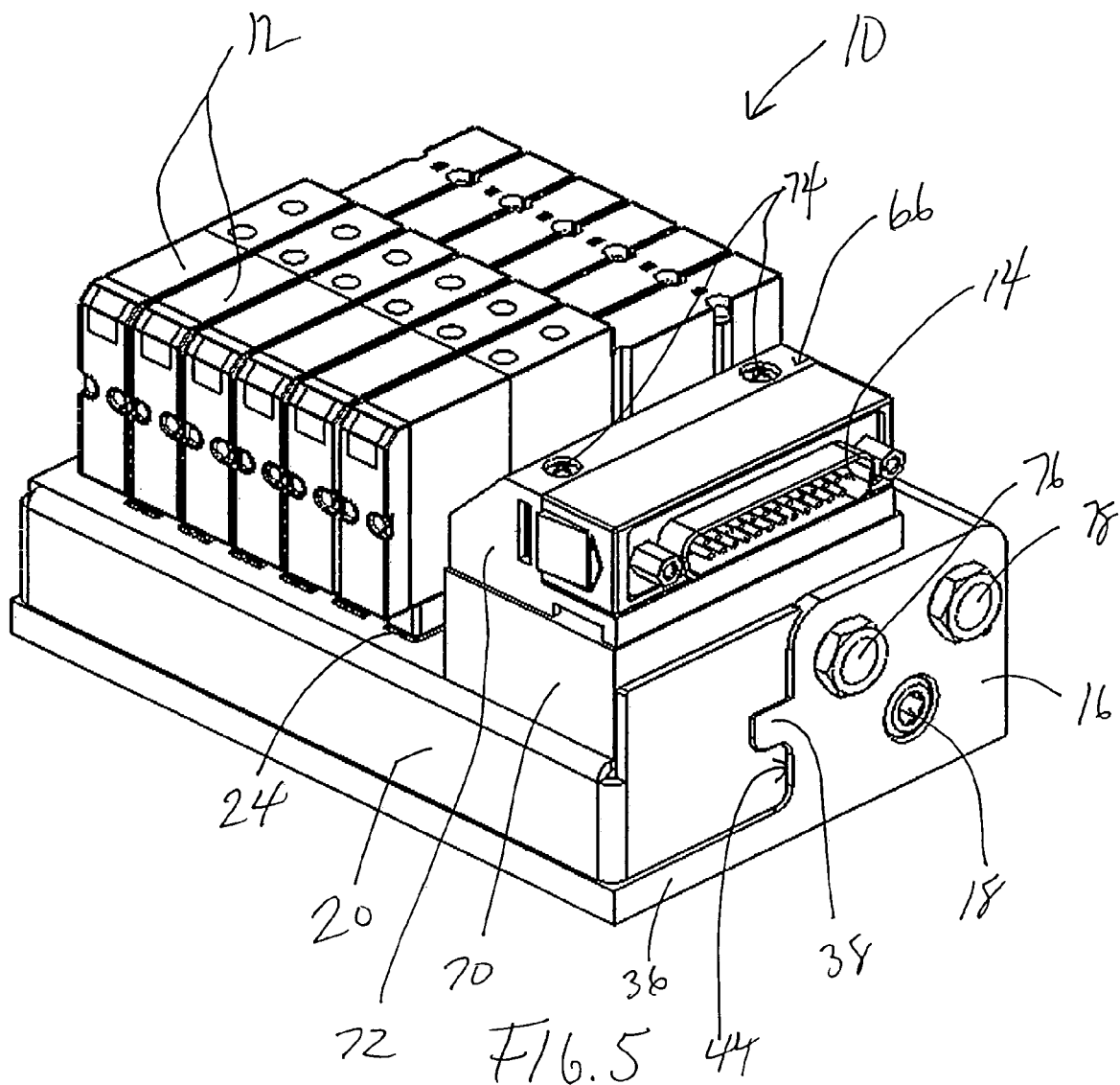
FIG. 5 illustrates another embodiment of the coupler.

FIG. 5 illustrates another embodiment of the present invention including a plurality of valves 12 and electrical connector 14, a manifold 16, and a support 20. In FIG. 5, the housing 66 includes a two piece housing having a first portion 70 and a second portion 72 coupled to the first portion 70 with a plurality of fasteners 74. In this embodiment, the electrical connector 14 faces and can be accessed along the same side of the manifold 16 including the apertures 18. Two of the apertures 18 have been sealed by a first and a second silencer 76 and 78 which exhaust air at a reduced sound level. These apertures can also be sealed by plugs or caps. Although not illustrated in this figure or in the previous figures, an opposite end of the manifold 16 can include a plurality of apertures 18 as well which can be coupled to corresponding conduits or can be sealed with caps as described. While FIGS. 1, 4, and 5 have illustrated three orientations of the electrical connector 14, any orientation is within the scope of the present invention. Also, while the housing 66 of FIG. 5 includes a first portion 70 and a second portion 72, the housing 66 is not limited to a certain number of portions or pieces and can include a one piece housing as well as housings having more than two portions or pieces.

Figure 6:
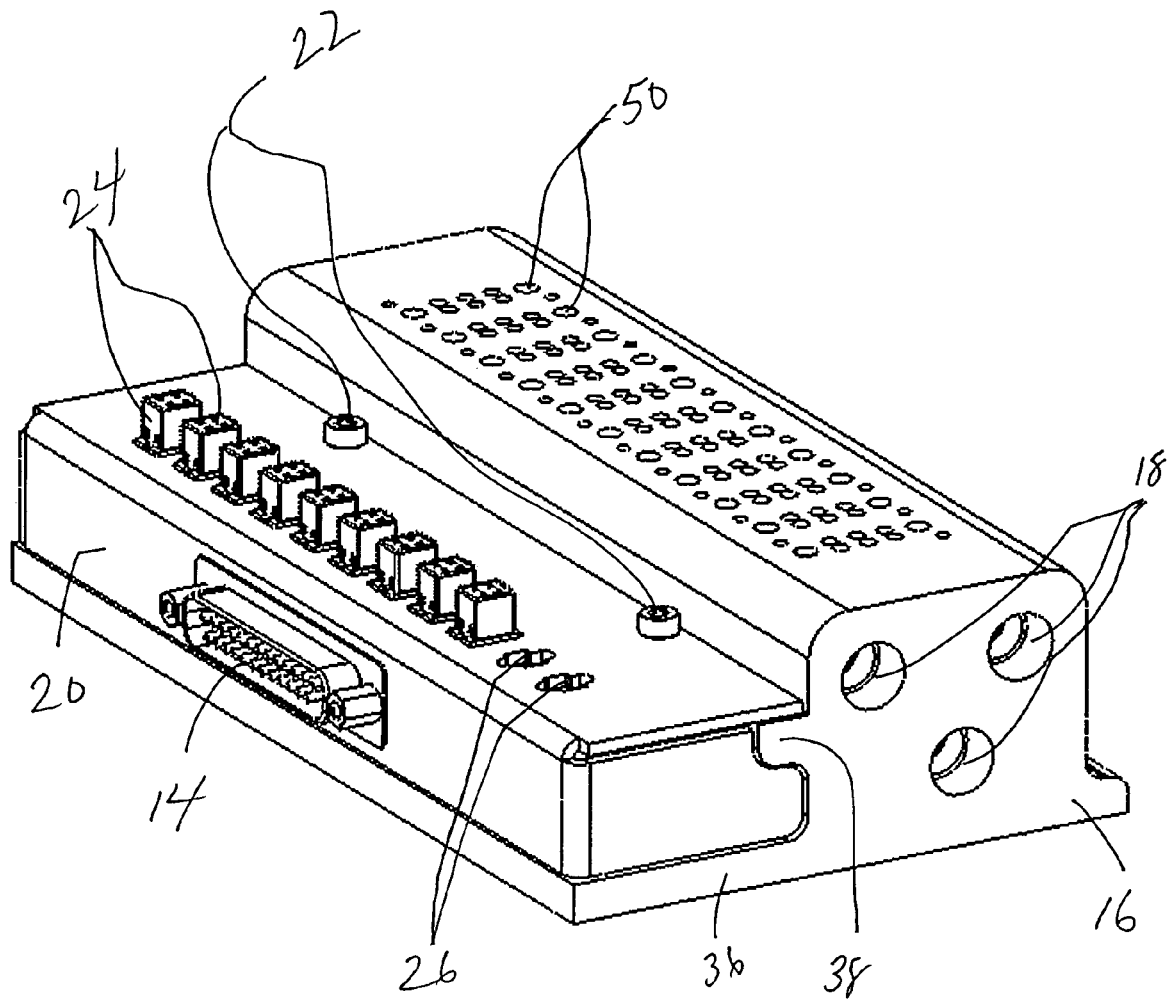
FIG. 6 illustrates a perspective view of a manifold, a connector support, and a plurality of connectors.
Figures 7A, 7B, 7C:
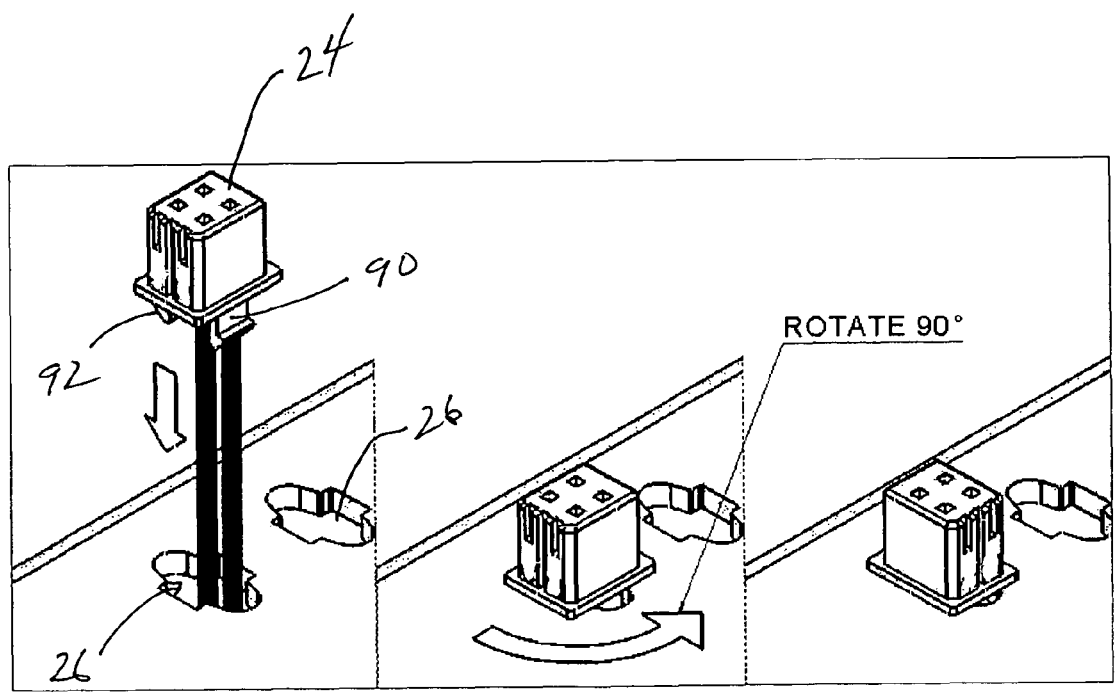
FIGS. 7A, B, and C illustrate an electrical connector received in an aperture of a connector support.

FIG. 6 illustrates the electrical connector 14 coupled to the support 20 which is in turn coupled to the manifold 16 of the coupler 10. The plurality of valves 12 are not shown to illustrate the connectors 24 which are aligned and retained or held by the support 20 by a plurality of apertures 26, two of which are illustrated without the connector. Each of the connectors 24 include a standard electrical connector typically used or inserted into a retaining piece or support which includes chamfers located on the top surface of the support such that legs including tabs of the connectors flex properly until locked in place. The apertures 26, however, being formed in the support 20 of the present invention do not include chamfers due to the method used to form the apertures 26. These methods can include laser cutting, stamping, or other known methods of forming apertures in metal. When stamped or laser cut, a top surface of the support 20 and an interior or side surface of the aperture meet to form a substantially perpendicular edge. Because the apertures 26 include a configuration adapted to receive a standard off-the-shelf connector 24, chamfers are not included. For instance, as illustrated in FIG. 7, a connector 24 having a first leg 90 and a second leg 92 can be inserted into the aperture 26 such that a 90° rotation of the connector 24 as illustrated in FIGS. 7B and 7C can lock or hold the connector 24 in place when inserted into the aperture 26.

Figure 8A:
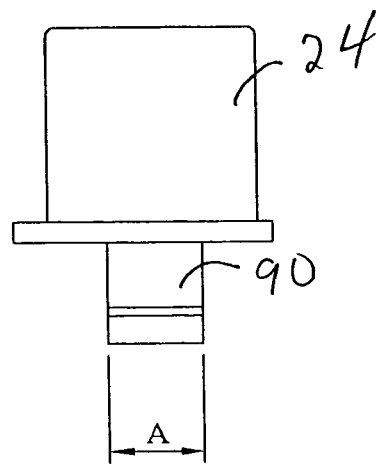
FIGS. 8A, B, and C illustrate an electrical connector of the prior art.
Figure 8B:
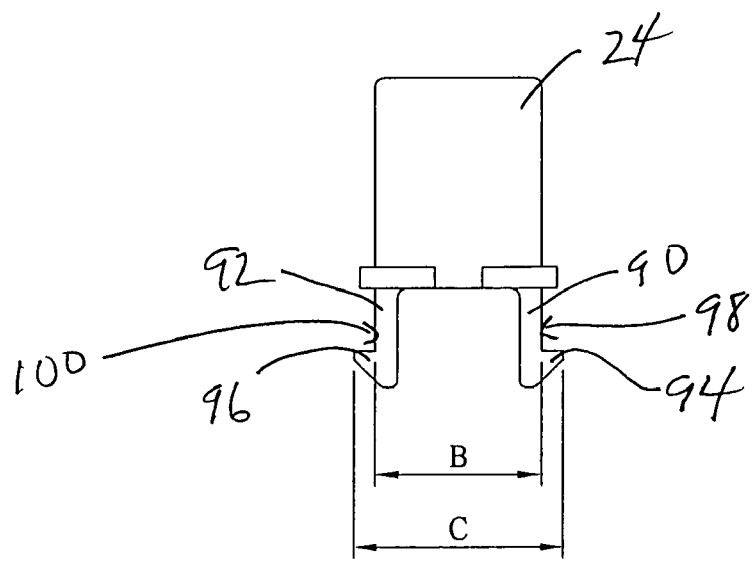

The connector 24 is illustrated in FIG. 8A having a width dimension A of a first leg 90 in a plan schematic elevational view. In FIG. 8B, the connector 24 has been rotated 90 degrees to illustrate that the first leg 90 and the second leg 92 each include respectively a tab 94 and a tab 96. The distance between a first surface 98 and a second surface 100 of each of the legs 90 and 92 is a dimension B and a distance between an outstanding portion of the first tab 94 and the second tab 96 is a dimension C. As further illustrated in FIG. 8C, a fourth distance, distance F is a distance between surfaces 98 and 100 but which is not aligned along an axis perpendicular to the surfaces such as dimension B. The distance D can include any distance between the surface 98 and the surface 100 which is not equivalent to the perpendicular distance B.

Figure 8C:
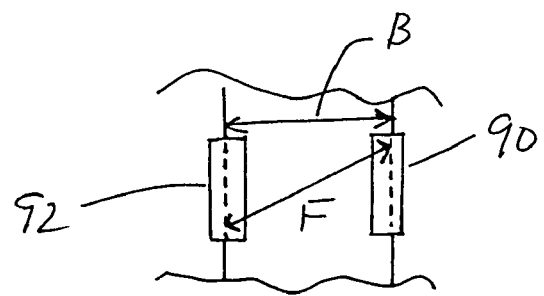
Figure 9A:
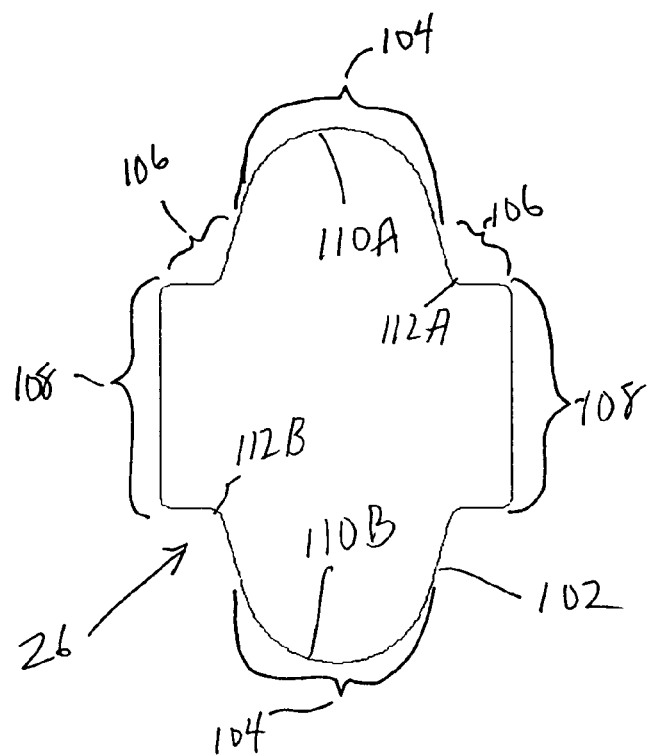
FIGS. 9A and B illustrate a plan view of an aperture.
Figure 9B:
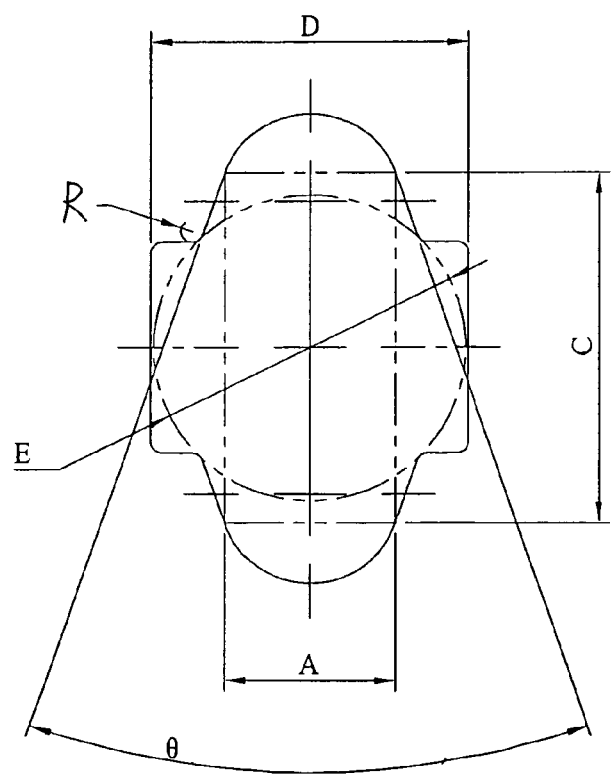

FIGS. 9A and 9B illustrate a perimeter 102 or outline of the aperture 26. The aperture 26 is formed in the support 20 to define a receiving portion 104, a transition portion 106, and a seating portion 108. While each of the portions described are generally shown by a curly bracket, the portions illustrated and described are not specifically limited to the end points of the bracket respectively but are generally defined as including those portions directed to the various described functions. The receiving portion 104 includes a curved portion 110 which is coupled to the transition portion 106 which is in turn coupled to the seating portion 108. As can be seen in FIG. 9B, a dimension A corresponds to the distance A of the width of legs 90 and 92 of the connector 24 as illustrated in FIG. 8. In addition, a dimension C is illustrated extending from the receiving portion 110A and the receiving portion 110B such that when the connector 24 is inserted into the aperture 26, the outstanding portions of the tabs 94 and 96 can be received within the aperture 24. Upon a 90 degree rotation of the connector 24, the surfaces 98 and 100 which are spaced a distance B apart do not contact points 112A and 112B of the corresponding transition portions 106. However, the diagonal distance F as illustrated in FIG. 8C is such that the points 112A and 112B come in contact with the outer surfaces 98 and 100 of each of the legs 92 and 90 to provide some tactile feedback that the connector can engage and be held within the aperture 24. Dimension F can be selected to determine the amount of contact force.

Once the connector 24 has been rotated to an approximately 90 degree position from which it was previously inserted, the surfaces 90 and 92 of each of the legs can be substantially aligned with the seating portions 108 which are spaced a distance D apart. This distance D can be selected such that it is less than C so that the connector can be retained within the aperture 24. Dimension D however, is larger than the dimension E such that the diagonal F can make contact with the points 112A and 112B to provide a tactile feedback or contact force. An angle θ, which is defined as the angle between two lines each being tangential to corresponding points 112 as well as where lines A and C intersect such that the angle of θ as illustrated is substantially the maximum allowable. R is the corner radius. The aperture can be therefore generally defined such that: $E^2<A^2+B^2$ and $E<D<C$.

As used herein terms relating to properties such as geometries, shapes, sizes, and physical configurations include properties that are substantially or about the same or equal to the properties described unless explicitly indicated to the contrary. While the invention has been illustrated and described in detail in the drawings and foregoing description, the same is to be considered as illustrative and not restrictive in character. For instance, it is within the scope of the present invention to form a manifold without a shelf and/or an undercut. Instead, the manifold can be formed to have a substantially perpendicular side wall, with respect to the base, which includes a slot into which a portion of the support 20 can be inserted. It should therefore be understood that preferred embodiments have been shown and described and that all changes and modifications that come within the spirit of the invention are desired to be protected.

What is claimed is:

1. A coupler comprising:
    a manifold including a first portion, a base portion extending outwardly from the first portion and defining a first surface, a standoff extending outwardly from the first portion defining a second surface, the first portion including an interface portion defining a third surface upon which a plurality of control valves can rest, and an undercut portion defined between the outwardly extending standoff and base portion, the base portion extending outwardly a greater distance than the standoff and wherein the first surface, second surface, and third surface are noncoplanar and substantially parallel to one another; and
    a connector support, coupled to the manifold, the connector support including an electrical interface portion and a tongue portion, the electrical interface portion defining a fourth surface adapted to receive a plurality of electrical connectors;
    wherein, when the connector support is coupled to the manifold, the connector support forms a wiring enclosure with the manifold and engages both the base portion and the standoff, and wherein the tongue portion is received by the undercut portion and the interface portion of the manifold is substantially parallel to the electrical interface portion of the connector support.

2. The coupler of claim 1, wherein the standoff comprises a ledge and the connector support comprises a cover, including an aperture, to receive a connector, the cover being coupled to the manifold.

3. The coupler of claim 2, wherein the connector support further comprising a mating feature engaged with the second surface.

4. The coupler of claim 3, wherein the mating feature is coupled to the ledge with at least one fastener.

5. The coupler of claim 4, wherein the cover comprises a sheet of material.

6. The coupler of claim 5, wherein the cover comprises sheet metal.

7. The coupler of claim 6, wherein the cover comprises a single piece of sheet metal.

8. The coupler of claim 1, wherein the support is coupled to the manifold by one or more fasteners.

9. The coupler of claim 8, wherein the standoff is adapted to include one or more apertures to receive the one or more fasteners.

10. The coupler of claim 9, wherein the connector support includes a mating feature engaging the second surface and is secured thereto with the one or more fasteners.

11. The coupler of claim 1, wherein the surface defined by the fluid interface portion of the manifold includes a plurality of apertures.

12. The coupler of claim 11, further comprising a plurality of gaskets adapted to accommodate coupling of the plurality of control valves to the manifold and to provide a fluid tight seal therebetween.

13. A coupler comprising:
    a manifold including a first portion, a base portion extending outwardly from the first portion and defining a first surface, a standoff portion extending outwardly from the first portion and defining a second surface, the first portion including an interface portion defining a third surface upon which a plurality of control valves can rest, and wherein an undercut portion is defined between the outwardly extending standoff portion and base portion, wherein the second surface and third surface are offset from and substantially parallel to one another; and
    a connector support including an electrical interface portion and a tongue portion, the electrical interface portion defining a fourth surface adapted to receive a plurality of electrical connectors;
    wherein, when the connector support is coupled to the manifold, the connector support forms a wiring enclosure with the manifold and engages both the base portion and the standoff portion and wherein the tongue portion is received by the undercut portion.

14. The coupler of claim 13, wherein the standoff portion comprises a ledge and the connector support comprises a cover including an aperture for receiving a connector, the cover being coupled to the manifold.

15. The coupler of claim 14, wherein the connector support comprises a mating feature, the mating feature contacting the second surface and being coupled to the standoff portion.

16. The coupler of claim 15, wherein the mating feature is coupled to the ledge.

17. The coupler of claim 14, wherein the cover comprises a sheet of material.

18. The coupler of claim 17, wherein the cover comprises sheet metal.

19. The coupler of claim 18, wherein the cover comprises a single piece of sheet metal.

20. The coupler of claim 13, wherein the connector support is coupled to the manifold by one or more fasteners.

21. The coupler of claim 20, wherein the standoff portion is adapted to include one or more apertures to receive the one or more fasteners.

22. The coupler of claim 13, wherein the third surface of the interface portion defines a plurality of apertures.

23. The coupler of claim 13, further comprising a plurality of gaskets adapted to accommodate coupling of the plurality of control valves to the manifold and to provide a fluid tight seal therebetween.

24. A coupler comprising:
    a manifold including a first portion, a base portion extending outwardly from the first portion and defining a first surface, a ledge extending outwardly from the first portion and defining a second surface, the first portion defining a third surface forming an interface upon which a plurality of control valves can rest, the first, second and third surfaces being noncoplanar and substantially parallel to one another, the base portion extending outwardly from the first portion a greater distance than the ledge and wherein an undercut region is defined between the outwardly extending ledge and base portion; and
    a sheet metal cover including a tongue portion, a mating feature and an electrical interface portion, the electrical interface portion defining a fourth surface and including a plurality of apertures adapted to receive a plurality of electrical connectors;

wherein, when the sheet metal cover is coupled to the manifold, the sheet metal cover engages the first surface and forms a wiring enclosure with the manifold; the tongue portion is disposed within the undercut region between the first surface and the outwardly projecting ledge; the fourth surface is disposed substantially parallel with the first, second and third surfaces; and the mating feature contacts and is secured to the second surface.

25. The coupler of claim 24 wherein the mating feature is secured to the second surface with a plurality of fasteners.

* * * * *